United States Patent
Sjogren et al.

(10) Patent No.: US 8,120,327 B2
(45) Date of Patent: Feb. 21, 2012

(54) SYSTEM AND METHOD FOR USING STORED ELECTRICAL ENERGY TO QUIET POWER SENSITIVE MEASUREMENT CIRCUITS

(75) Inventors: Allen Erik Sjogren, Park City, UT (US); Richard W. Walker, Alpine, UT (US)

(73) Assignee: Fluke Corporation, Everett, WA (US)

( * ) Notice: Subject to any disclaimer, the term of this patent is extended or adjusted under 35 U.S.C. 154(b) by 438 days.

(21) Appl. No.: 12/477,791

(22) Filed: Jun. 3, 2009

(65) Prior Publication Data
US 2010/0308772 A1    Dec. 9, 2010

(51) Int. Cl.
*H01M 10/46*    (2006.01)
(52) U.S. Cl. ............................................. 320/140
(58) Field of Classification Search .................. 320/137, 320/140, 166; 323/288; 363/17, 21.11, 98, 363/132
See application file for complete search history.

(56) References Cited

U.S. PATENT DOCUMENTS

| | | | |
|---|---|---|---|
| 6,215,288 B1* | 4/2001 | Ramsey et al. | 323/224 |
| 6,545,883 B2* | 4/2003 | Xing et al. | 363/21.11 |
| 2002/0167821 A1* | 11/2002 | Xing et al. | 363/21.11 |
| 2006/0187684 A1* | 8/2006 | Chandrasekaran et al. | 363/16 |

* cited by examiner

*Primary Examiner* — Edward Tso
(74) *Attorney, Agent, or Firm* — Christensen O'Connor Johnson Kindness PLLC

(57) ABSTRACT

The present invention is a system and method for temporarily storing electrical energy to power sensitive measurement circuits. In one embodiment, a switch-mode power converter is operable to charge an energy storage device. After the energy storage device is sufficiently charged, the switch-mode power converter is powered off so that sensitive measurements may be made without being affected by noise or interference caused by the switch-mode power converter. Once the measurement has been made, the switch-mode power converter is powered on and provides power to the energy storage device to recharge the energy storage device so that a subsequent measurement may be made.

25 Claims, 4 Drawing Sheets

SYSTEM AND METHOD FOR USING STORED ELECTRICAL ENERGY TO QUIET POWER SENSITIVE MEASUREMENT CIRCUITS

TECHNICAL FIELD

This invention relates to measurement circuits, and more particularly, embodiments of the invention relate to using stored electrical energy for quiet powering sensitive measurement circuits.

BACKGROUND OF THE INVENTION

Electrical noise and interference affects the accuracy of electrical measurements, particularly in sensitive measurement circuits. For instance, excessive noise in a system can cause measurements of an electrical parameter, such as voltage or current, to appear random with time. In sensitive measurement circuits, in which small changes in a parameter are being measured, small amounts of noise can make a measurement unreliable. One known source for causing noise in a system is a power supply. For instance, main power supplies, such as a DC power supply, are known to introduce noise into a system. Furthermore, long electrical wires for electrically coupling the measurement circuit to the main power supply introduce interference into the system. Thus, main power supplies are known to affect the accuracy of sensitive measurement circuits.

Other systems for making analog to digital conversion include using switch-mode power converters to power the measurement circuits. Typically, the switch-mode power converter is used to provide the appropriate voltages required to power the measurement circuit and/or provide ground isolation. In general the system includes a main power supply, such as a AC-DC power supply or DC power supply, that is coupled to the switch-mode power converter. Unfortunately switching power supplies are inherently noisy and introduce a significant amount of noise into a measurement system affecting the accuracy of measurements made by sensitive measurement circuits.

Therefore, there is a need for a system that further reduces the effects of noise introduced in sensitive measurement circuits.

SUMMARY OF THE INVENTION

The present invention is directed toward methods and apparatuses for using stored electrical energy to quiet power sensitive measurement circuits. In one aspect of the invention a system includes a measurement circuit coupled to an energy storage device. The system further includes a switch-mode power converter coupled to the energy storage device. The switch-mode power converter is operable to receive power at an input terminal. The measurement circuit is operable to measure an electrical parameter. A switch may be coupled to the switch-mode power converter. In one embodiment, the switch is operable to couple power to the input terminal of the switch-mode power converter to power on the switch mode converter. When the switch-mode power converter is powered on, the switch-mode power converter is operable to charge the energy storage device. The switch is further operable to decouple power from the input terminal of the switch-mode power converter to power off the switch-mode power converter. When the switch-mode power converter is powered off, the energy storage device is operable to power the measurement circuit.

In another aspect of the invention a system includes a measurement circuit operable to measure an electrical parameter. The system further includes a switch-mode power converter operable to function in two modes. The first mode is an active mode in which the switch-mode power converter provides power to an output terminal. The second mode is an inactive mode in which the switch-mode power converter discontinues power from being provided to the output terminal. The system further includes an energy storage device coupled to the measurement circuit and switch-mode power converter. The energy storage device is operable to power the measurement circuit when the switch-mode power converter functions in the second mode. The switch-mode power converter is operable to charge the energy storage device when the switch-mode power converter functions in the first mode.

DETAILED DESCRIPTION OF PREFERRED EMBODIMENTS

Embodiments of the present invention are directed toward measurement circuits, and more particularly, one or more embodiments of the invention relate to using stored electrical energy for powering sensitive measurement circuits. Certain details are set forth below to provide a sufficient understanding of the embodiments of the invention. However, it will be clear to one skilled in the art that various embodiments of the invention may be practiced without these particular details.

Figure 1:
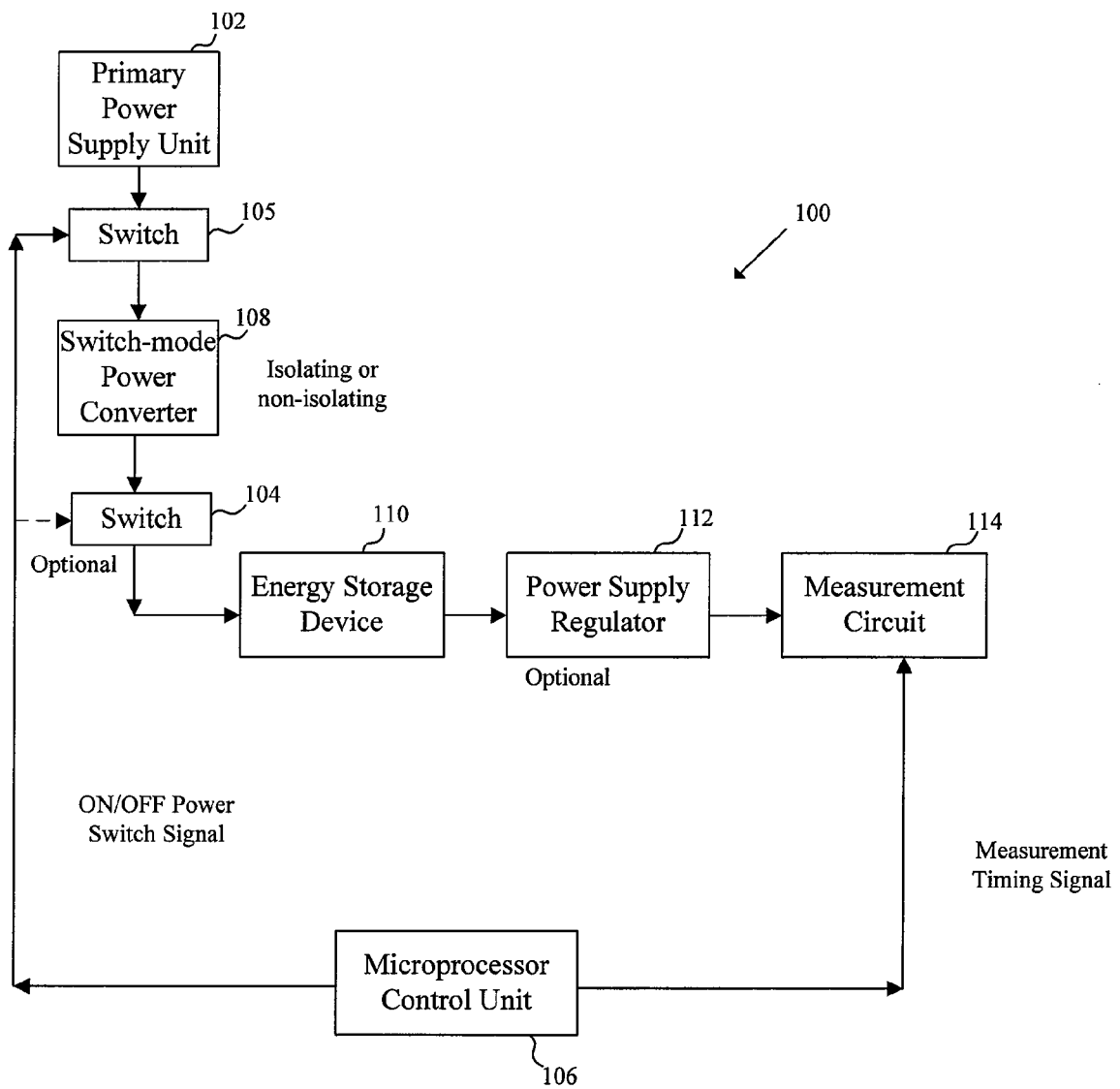
FIG. 1 is a block diagram in accordance with one embodiment of the invention.

FIG. 1 is a block diagram of a system 100 for measuring electrical parameters using sensitive measurement circuits according to one embodiment of the invention. In this embodiment, the system 100 includes a primary power supply 102, an optional switch 104, a switch 105, a microprocessor control circuit 106, a switch-mode power converter 108, an energy storage device 110, a measurement power supply regulator 112, and a measurement circuit 114. The primary power supply 102 may be any suitable power supply for providing electrical energy to the system 100. In one embodiment, the primary power supply 102 is a DC power supply, such as a battery. In another embodiment, the primary power supply 102 is an AC/DC power supply. An output of the primary power supply 102 may be coupled to an input of the switch 105. An output of the switch 105 may be coupled to an input of the switch-mode power converter 108. As is illustrated in FIG. 1, an output terminal of the switch-mode power converter 108 may be coupled to an input terminal of the switch 104. The switch-mode power converter 108 may be any switch-mode power converter, such as an electronic power converter that incorporates a switching regulator. In one embodiment, the switch-mode power converter 108 is a DC to DC converter.

If the switch 104 is included, an output terminal of the switch 104 may be coupled to an input terminal of the energy storage device 110. The energy storage device 110 may be operable to store a finite amount of electrical energy, such as a battery or a capacitor. In particular, the energy storage device 110 may be operable to store a sufficient amount of energy to temporarily power the measurement circuit 114. An output of the energy storage device 110 may be coupled to an input terminal of the measurement power supply regulator 112. The measurement power supply regulator 112 regulates power supplied to the measurement circuit 114. An output terminal of the measurement power supply regulator 112 may be coupled to an input terminal of the measurement circuit 114. The measurement circuit 114 may be any circuit operable to measure an electrical parameter, such as voltage or current. For instance, in one embodiment, the measurement circuit 114 is an analog to digital converter. An output of the microprocessor control circuit 106 may be coupled to an input of the measurement circuit 114. In one embodiment, the system 100 does not include the measurement power supply regulator 112. In this embodiment, an output terminal of the energy storage device 110 may be coupled to an input of the measurement circuit 114. As will be discussed in more detail below, the switch-mode power converter 108 is operable to charge the energy storage device 110. For instance, in one embodiment the switch-mode power converter 108, such as a DC to DC converter, charges the energy storage device 110, such as a capacitor by applying a voltage to the capacitor.

The microprocessor control circuit 106 may be coupled to an input of the switch 105 and optional switch 104. As will be discussed in more detail below, the switch 105 may be operable to disconnect power supplied to an input terminal of the switch-mode power converter 108 in response to receiving one or more control signals from the microprocessor control circuit 106. When the switch 105 disconnects power to the switch-mode power converter 108, the switch-mode power converter 108 is powered off and the energy storage device 110 supplies the power to the measurement power supply regulator 112 (if included) and the measurement circuit 114. In particular, the energy storage device 110 is operable to provide sufficient energy to power at least the measurement circuit 114 to measure an electrical parameter in a device under test.

By powering off the switch-mode power converter 108 during the measurement or analog to digital conversion, the amount of noise and interference introduced into the measurement is significantly reduced. In particular, the switch-mode power converter 108 does not conduct, generate, and/or radiate electromagnetic interference during the measurement. Therefore, the measurement circuit 114 is operable to make sensitive measurements without the effects of the inherently noisy switch-mode power converter 108.

As discussed above, in one embodiment the system 100 further includes a switch 104. However, in many embodiments, the switch 104 is not included. The switch 104 may be operable to decouple the switch-mode power converter 108 from the energy storage device 110 in response to one or more control signals from the microprocessor control circuit 106. In this embodiment, the switch-mode power converter 108 is decoupled from the energy storage device 110 before a measurement is made by the measurement circuit 114. Decoupling the switch-mode power converter 108 from the energy storage device 110 may prevent the switch-mode power converter 108 from draining power from the energy storage device 110. In this embodiment, the switch-mode power converter 108 is powered off and the switch-mode power converter 108 is decoupled from the energy storage device 110. In yet another embodiment, the switch 105 is not included in the system 100 and the switch 104 is included in the system 100. Therefore, rather than powering down the switch-mode power converter 108 with switch 105, the switch 104 decouples the switch-mode power converter 108 from the energy storage device 110.

Figure 2:
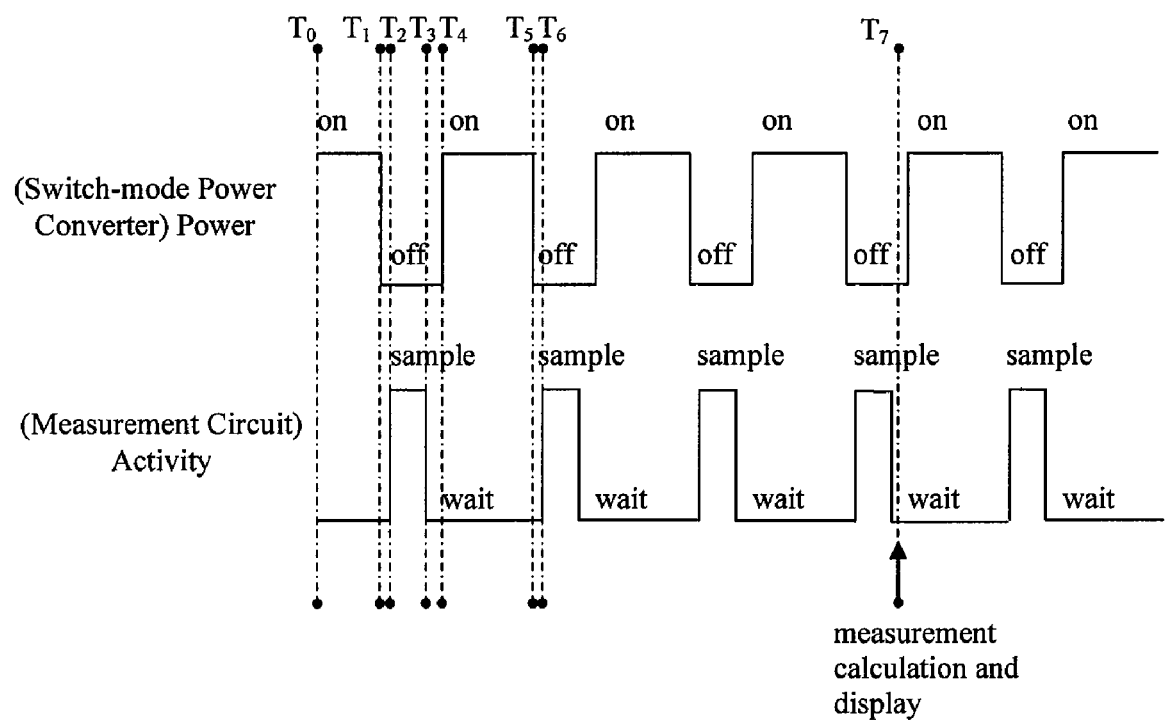
FIG. 2 is a timing diagram according to one embodiment of the invention.

As discussed above, the microprocessor control circuit 106 is coupled to the measurement circuit 114. The microprocessor control circuit 106 is operable to provide measurement timing signals to the measurement circuit 114. In particular, the microprocessor control circuit 106 provides measurement timing signals to the measurement circuit 114 such that measurement circuit 114 measures an electrical parameter while the switch-mode power converter 108 is powered off. After the measurement is complete, the switch-mode power converter 108 is powered on in response to receiving one or more control signals from the microprocessor control circuit 106. After the switch-mode power converter 108 is powered on the switch-mode power converter 108 may recharge the energy storage device 110. Some time after the switch-mode power converter 108 has recharged the energy storage device 110, the switch-mode power converter 108 may be again powered off in response to subsequent control signals provided by the microprocessor control circuit 106 to the switch 105. As before, while the switch-mode power converter 108 is powered off, the energy storage device 110 provides power to the measurement power supply regulator 112 and the measurement circuit 114. At this time another measurement or set of measurements may be made. This may be repeated until a particular number of measurements have been made. The timing of the control signals and measurement timing signals provided by the microprocessor control circuit 106 are shown in a timing diagram in FIG. 2. At time $T_0$ power is coupled to the input terminal of the switch-mode power converter 108 so that the switch-mode power converter is powered on. Additionally, the switch-mode power converter is coupled to the energy storage device 110. During this time the switch-mode power converter 108 may be charging the energy storage device 110 or the energy storage device 110 may be already charged. At time $T_1$ the switch 105 decouples power supplied to the input terminal of the switch-mode power converter 108 in response to a control signal from the microprocessor control circuit 106. During this time the energy storage device 110 supplies the power to the measurement power supply regulator 112 and the measurement circuit 114. As is discussed above, in one embodiment the switch 104 may decouple the switch-mode power converter 108 from the energy storage device. This will typically take place some time between before $T_1$ until some time before $T_2$.

At some time between $T_1$ and $T_4$, the measurement circuit 114 may measure an electrical parameter of the device being tested in response to timing signals from the microprocessor control circuit 106. For instance, at $T_2$ the measurement circuit 114 begins measuring an electrical parameter of the device being tested. As discussed above, because the inherently noisy switch-mode power converter 108 is powered off while sensitive measurements are made with the measurement circuit 114, the measurements provide greater accuracy. At time $T_3$, the measurement circuit 114 stops measuring the electrical parameter. At time $T_4$, power is recoupled to the input terminal of the switch-mode power converter 108.

At time $T_4$ and until some time before $T_5$ the switch-mode power converter 108 recharges the energy storage device 110. At time $T_5$ power is decoupled to the switch-mode power converter 108 so that the switch-mode power converter is powered off again, and the energy storage device 110 supplies the power to the measurement power supply regulator 112 and the measurement circuit 114. At $T_6$ the measurement circuit 114 begins measuring an electrical parameter of the device being tested in response to receiving subsequent timing signals from the microprocessor control circuit 106. As can be seen from the timing diagram in FIG. 2, this process continues until four measurements have been made. At time $T_7$ the measurement circuit 114 calculates the average measurement made and displays the average measurement. As will be clear to a person having ordinary skill in the art, any number of measurements may be made prior to displaying the measurement, including one measurement.

Figure 3:
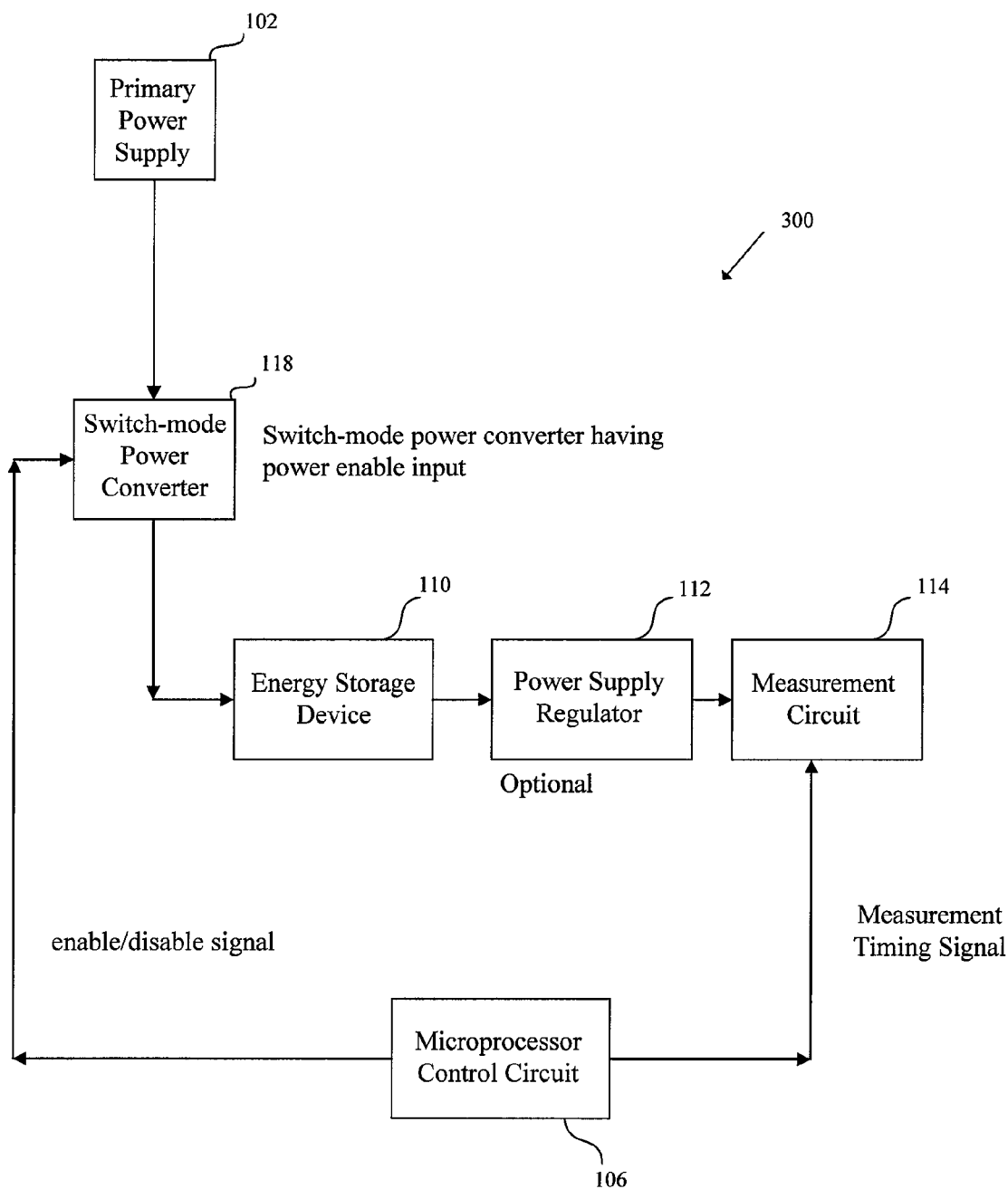
FIG. 3 is a block diagram in accordance with another embodiment of the invention.

FIG. 3 is a block diagram of a system 300 for measuring an electrical parameter using sensitive measurement circuits according to another embodiment of the invention. Most of the components in the system 300 are used in the system 100 shown in FIG. 1 and operate in the same manner. Therefore, in the interest of brevity, an explanation of each component's structure and function will not be repeated. The system 300 differs from the system 100 in FIG. 1 by not having the switch 104 and switch 105. In addition, the system 300 includes a switch-mode power converter 118 having a control input terminal operable to power off and on the switch-mode power converter 118 in response to receiving a disable and enable signal, respectively, from the microprocessor control circuit 106. In particular, when the control input of the switch-mode power converter 118 receives an enable signal from the microprocessor control circuit 106, the switch-mode power converter 118 supplies power to a switch-mode circuit in the switch-mode power converter 118 and the switch-mode power converter 118 is powered on. When the switch-mode power converter 118 receives a disable signal from the microprocessor control circuit 106, the switch-mode power converter 118 decouples power to the switch-mode circuit to power off the switch-mode power converter.

As in the embodiment discussed in reference to FIG. 1, the energy storage device 110 in system 300 supplies the power to the measurement power supply regulator 112 (if included) and the measurement circuit 114 when the switch-mode power converter 118 is powered off so that a sensitive measurement may be made without the noise and interference from the switch-mode power converter 118 affecting the measurement. To repower the switch-mode power converter 118, the microprocessor control circuit 106 provides an enable signal to the switching power supply unit 118. In response to receiving the enable signal, the switch-mode power converter 118 is powered on. As in the embodiment discussed in reference to FIG. 1, the switch-mode power converter 118 recharges the energy storage device 110 when the switch-mode power converter 118 is turned on.

Figure 4:
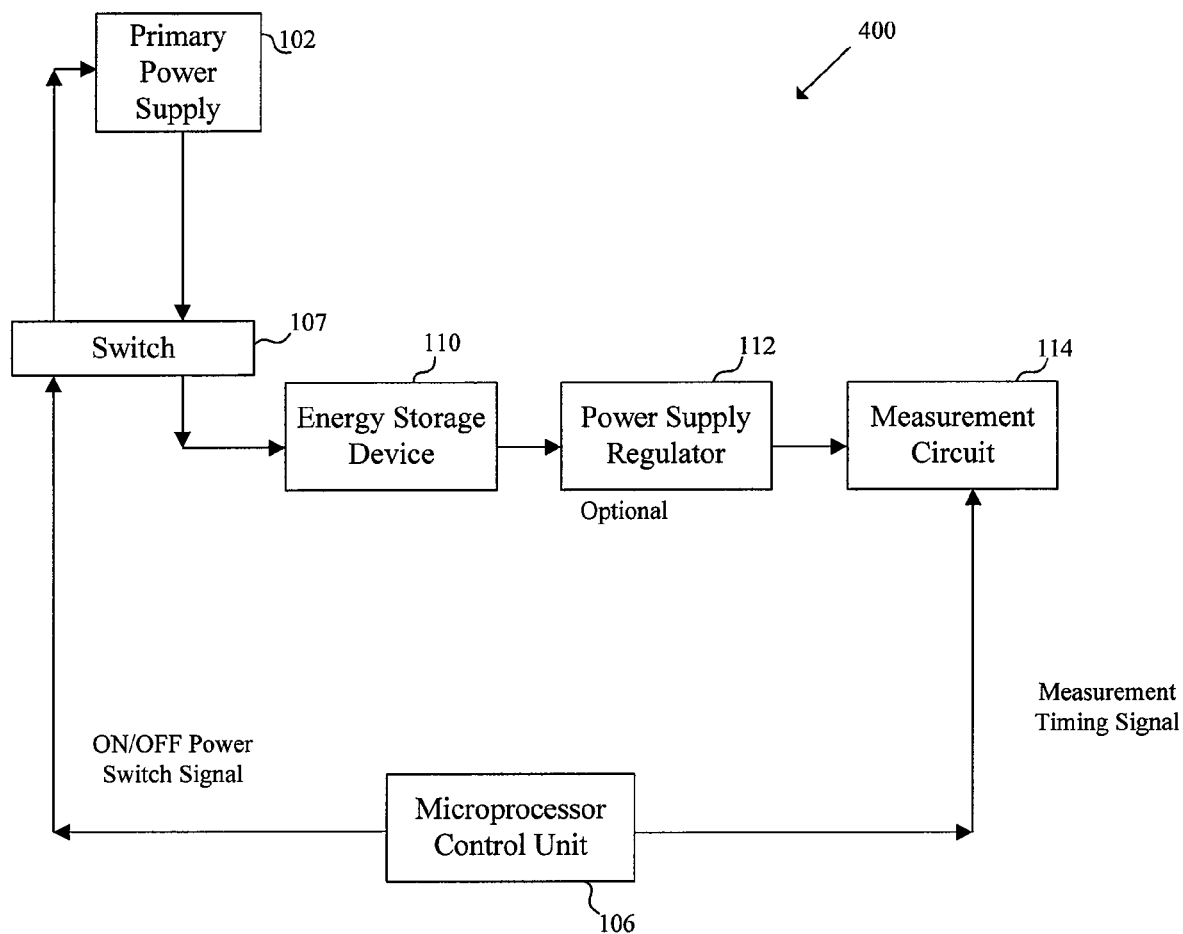
FIG. 4 is a block diagram in accordance with another embodiment of the invention.

FIG. 4 is a block diagram of a system 400 for measuring an electrical parameter using sensitive measurement circuits according to another embodiment of the invention. Most of the components in the system 400 are used in the system 100 shown in FIG. 1 and operate in the same manner. Therefore, in the interest of brevity, an explanation of each component's structure and function will not be repeated. The system 400 differs from the system 100 in FIG. 1 by not including the switch-mode power converter 108, and the switch 104, and the switch 105. In this embodiment, the primary power supply 102 charges the energy storage device 110. The primary power supply 102 may be a linear power supply, such as a battery, or a switching power supply, such as an AC/DC switching power supply.

The system 400 includes a switch 107. In one embodiment, the switch 107 is operable to disable the primary power supply 102. In this embodiment, the microprocessor control circuit 106 may be powered by the energy storage device 110 or another device when the primary power supply 102 is disabled. In another embodiment, the switch 107 is further operable to decouple the primary power supply 102 from the energy storage device 110. In yet another embodiment, the switch is operable to decouple the primary power supply 102 from the energy storage device 110 but does not power down the primary power supply. While the primary power supply 102 is disabled and/or decoupled from the energy storage device 110, the energy storage device 110 powers the measurement circuit 114. During this time, the measurement circuit 114 is operable to make sensitive measurements without noise and interference from the primary power supply.

As will be clear to a person having ordinary skill in the art, the above embodiments may also include a plurality of measurement circuits 114, energy storage devices 110, switch-mode power converters 108 and 118 so that multiple measurements may be made at roughly the same time or at different times.

Although the present invention has been described with reference to the disclosed embodiments, persons skilled in the art will recognize that changes may be made in form and detail without departing from the spirit and scope of the invention. Such modifications are well within the skill of those ordinarily skilled in the art. Accordingly, the invention is not limited except as by the appended claims.

What is claimed is:

1. A system comprising:
    a measurement circuit operable to measure an electrical parameter;
    an energy storage device coupled to the measurement circuit;
    a switch-mode power converter coupled to the energy storage device, the switch-mode power converter being operable to receive power at an input terminal; and
    a first switch coupled to the switch-mode power converter operable to couple power to the input terminal of the switch-mode power converter to power on the switch-mode power converter, wherein when the switch-mode power converter is powered on, the switch-mode power converter is operable to charge the energy storage device,
    the first switch being further operable to decouple power from the input terminal of the switch-mode power converter to power off the switch-mode power converter, wherein when the switch-mode power converter is powered off, the energy storage device is operable to power the measurement circuit.

2. The system of claim 1 further comprising a microprocessor control circuit, the microprocessor control circuit being operable to provide a first control signal to the first switch, wherein the first switch is operable to couple power to the input terminal of the switch-mode power converter in response to receiving the first control signal from the microprocessor control circuit, and wherein the first switch is further operable to decouple power to the input terminal of the switch-mode power converter in response to receiving a second control signal from the microprocessor control circuit.

3. The system of claim 2 wherein the microprocessor control circuit is further operable to provide a measurement timing signal to the measurement circuit and is further operable to provide the second control signal to the first switch so power is decoupled from the input terminal of the switch-mode power converter when the measurement circuit measures the electrical parameter.

4. The system of claim 1 wherein the switch-mode power converter comprises a DC to DC converter.

5. The system of claim 1 wherein the energy storage device comprises a capacitor or a battery.

6. The system of claim 1 wherein the switch-mode power converter is further coupled to a primary power supply, the primary power supply being a DC power supply or an AC/DC power supply.

7. The system of claim 1 further comprising a second switch coupled to an output terminal of the switch-mode power converter, wherein the second switch is operable to decouple the switch-mode power converter from the energy storage device.

8. The system of claim 1 further comprising a power supply regulator coupled to the energy storage device and the measurement circuit, wherein the power supply regulator is operable to regulate power supplied to the measurement circuit.

9. A system comprising:
a measurement circuit operable to measure an electrical parameter;
a switch-mode power converter comprising a switch-mode circuit, wherein the switch-mode power converter is operable to function in a first mode and a second mode, the first mode being an active mode in which the switch-mode power converter provides power to the switch-mode circuit to power on the switch-mode power converter, and the second mode being an inactive mode in which the switch-mode power converter discontinues power from being provided to the switch-mode circuit to power off the switch-mode power converter; and
an energy storage device coupled to the measurement circuit and the switch-mode power converter, wherein the energy storage device is operable to power the measurement circuit when the switch-mode power converter functions in the second mode, and wherein the switch-mode power converter is operable to charge the energy storage device when the switch-mode power converter functions in the first mode.

10. The system of claim 9 further comprising a microprocessor control circuit coupled to the switch-mode power converter, wherein the microprocessor control circuit is operable to provide an enable signal to the switch-mode power converter, the enable signal being operable to cause the switch-mode power converter to function in the first mode.

11. The system of claim 10 wherein the microprocessor control circuit is further operable to provide a disable signal to the switch-mode power converter, the disable signal being operable to cause the switch-mode power converter to function in the second mode.

12. The system of claim 9 wherein the switch-mode power converter comprises a DC to DC converter.

13. The system of claim 9 wherein the energy storage device comprises a capacitor or a battery.

14. The system of claim 9 further comprising a primary power supply coupled to the switch-mode power converter, the primary power supply being a DC power supply or an AC/DC power supply.

15. The system of claim 9 wherein the measurement circuit is operable to measure an electrical parameter of a device when the switch-mode power converter functions in the second mode.

16. The system of claim 9 further comprising a power supply regulator coupled to the energy storage device and the measurement circuit, wherein the power supply regulator is operable to regulate power supplied to the measurement circuit.

17. A method of measuring an electrical parameter of a device, comprising:
coupling power to a switch-mode power converter;
charging an energy storage device using the power coupled to the switch-mode power converter;
decoupling power from the switch-mode power converter;
while power is decoupled from the switch-mode power converter, measuring the electrical parameter of the device using power from the energy storage device; and
recoupling power to the switch-mode power converter.

18. The method of claim 17 further comprising charging the energy storage device a second time after power is recoupled to the switch-mode power converter.

19. The method of claim 18 further comprising decoupling the switch-mode power converter from the energy storage device.

20. The method of claim 19 wherein the act of measuring the electrical parameter of the device comprises measuring the electrical parameter when the switch-mode power converter is decoupled from the energy storage device.

21. The method of claim 17 wherein the switch-mode power converter is operable to function in a first mode and a second mode, the first mode being an active mode in which the switch-mode power converter is coupled to the energy storage device, and the second mode being an inactive mode in which the switch-mode power converter is decoupled from the energy storage device.

22. The method of claim 17 further comprising displaying a measurement, the measurement being determined in part from a plurality of measurements of the electrical parameter.

23. A system, comprising:
a measurement circuit operable to measure an electrical parameter;
an energy storage device coupled to the measurement circuit;
a primary power supply coupled to the energy storage device and operable to charge the energy storage device; and
a switch coupled to the primary power supply,
wherein the switch is operable to decouple the primary power supply from the energy storage device, and while the primary power supply is decoupled from the energy storage device, the energy storage device is operable to power the measurement circuit to measure an electrical parameter, and
wherein the switch is further operable to recouple the primary power supply to the energy storage device, and while the primary power supply is recoupled to the energy storage device, the primary power supply is again operable to charge the energy storage device.

24. The system of claim 23 wherein the energy storage device comprises a capacitor or a battery.

25. The system of claim 23 wherein the primary power supply comprises an AC to DC converter or a battery.

* * * * *